(12) United States Patent
Rouault et al.

(10) Patent No.: US 7,386,071 B2
(45) Date of Patent: Jun. 10, 2008

(54) METHOD AND APPARATUS FOR DECODING AN INCIDENT UWB SIGNAL WITH INTER SYMBOL INTERFERENCES

(75) Inventors: Lucille Rouault, Collonges (FR); Sylvain Chaillou, Paris (FR); Joseph Boutros, Saint-Mande (FR)

(73) Assignees: STMicroelectronics N.V., Amsterdam (NL); STMicroelectronics SA, Montrouge (FR)

( * ) Notice: Subject to any disclaimer, the term of this patent is extended or adjusted under 35 U.S.C. 154(b) by 203 days.

(21) Appl. No.: 11/337,029

(22) Filed: Jan. 20, 2006

(65) Prior Publication Data

US 2006/0188002 A1 Aug. 24, 2006

(30) Foreign Application Priority Data

Jan. 21, 2005 (EP) .................................. 05290140

(51) Int. Cl.
*H03K 9/04* (2006.01)
*H04L 27/06* (2006.01)

(52) U.S. Cl. ........................ 375/343; 375/340; 375/239

(58) Field of Classification Search ................ 375/130, 375/140, 142–144, 147, 148, 150, 285, 346, 375/343, 340, 316, 341, 261, 262, 239
See application file for complete search history.

(56) References Cited

U.S. PATENT DOCUMENTS 5,832,045 A 11/1998 Barber ........................ 375/348
5,991,273 A * 11/1999 Abu-Dayya ................ 370/252
6,137,788 A * 10/2000 Sawahashi et al. ......... 370/342
6,944,245 B2 * 9/2005 Stewart et al. ............. 375/350
2004/0240523 A1 12/2004 Mimura et al. ............. 375/130

FOREIGN PATENT DOCUMENTS

EP 1-684-440 * 7/2006

OTHER PUBLICATIONS

Sung Soo Hwang et al., "Performance of an Indoor Optical Wireless PPM-CDMA System with Interference Cancellation Schemes", The 8th IEEE Int'l Symposium on Personal, Indoor and Mobile Radio Communications, IEEE New York, NY, USA, vol. 3, 1997, pp. 974-978, XP-002332254.

(Continued)

*Primary Examiner*—Tesfaldet Bocure
(74) *Attorney, Agent, or Firm*—Lisa K. Jorgenson; Allen, Dyer, Doppelt, Milbrath & Gillchrist, P.A.

(57) ABSTRACT

The method is for decoding an incident UWB signal including successive incident pulses respectively received during successive Pulse Repetition Periods (PRP). The method includes determining a correlation matrix, whose terms respectively represent the correlation between all the M possible symbols transmitted in a current (PRP), and at least in the previous and in the next (PRP), and performing a correlation between an incident current pulse received during a current PRP and the M possible symbols transmitted in the current PRP and at least in the previous and in the next PRPs for obtaining a correlation vector. The method also includes preprocessing the correlation vector including reducing the effect of ISI from the correlation vector by using the correlation matrix, and decoding the preprocessed correlation vector for obtaining the bits of the transmitted symbol included in the incident received current pulse.

28 Claims, 4 Drawing Sheets

OTHER PUBLICATIONS

Rouault et al., "A Priori Probability Calculation for UWB Systems Using Correlated PPM and Polarity Modulation", IEEE Conference on Nov. 16-19, 2003, Piscataway, NJ, USA, pp. 408-412, XP-010684145; ISBN: 0-7803-8187-4.

Bayestch et al., "Iterative Interference Cancellation and Decoding for a Coded UWB-TH-CDMA System in AWGN Channel", IEEE, Piscataway, NJ, USA, vol. 1, Sep. 2, 2002, pp. 263-267; XP010615606; ISBN: 0-7803-7627-7.

Takizawa et al., "Combined Iterative Demapping and Decoding for Coded MBOK DS-UWB Systems", Institute of Electronics Information and Comm., Eng. Tokyo, Japan, vol. E87-A, No. 10 dated Oct. 2004, pp. 2621-2629, XP-001210461.

Hyung-Jin Lee et al., "Toward Digital UWB Radios: Part II—A System Design to Increase Data Throughput for a Frequency Domain UWB Receiver", Int'l Workshop on Kyoto, Japan; May 18-21, 2004, IEEE, Piscataway, NJ, USA, pp. 253-257, XP-010716251; ISBN: 0-7803-8373-7.

* cited by examiner

METHOD AND APPARATUS FOR DECODING AN INCIDENT UWB SIGNAL WITH INTER SYMBOL INTERFERENCES

FIELD OF THE INVENTION

The present invention relates in general to decoding for coherent systems with Pulse Position Modulation (PPM), and more particularly PPM with Inter Symbol Interferences (ISI). The invention is directed in general to the field of wireless communication systems, and more particularly to the Ultra Wide Band (UWB) wireless communication systems.

BACKGROUND OF THE INVENTION

Ultra Wide Band radio technology is a known to those skilled in the art. Many definitions exist for UWB technology. For example, UWB technology differs from conventional narrow band radio and spread-spectrum technologies in that the bandwidth of the signal at −10 dB is typically greater that 20% of the center frequency, or at least 500 MHz wide.

Until now, existing Ultra Wide Band approaches with a Pulse Position Modulation do not treat ISI. Indeed, symbol times are chosen wide enough so as to minimize ISI. Thus, systems developed by companies like Xtreme Spectrum with the standard IEEE 802.15 or the European search group UCAN have restricted bit rate to take into account this constraint. With this approach, the transmission can be performed without regard to the ISI.

To consider higher bit rate, known approaches comprise algorithms to process ISI, only using hard input/output. For example such approaches comprise classic equalizers like a Decision Feedback Equalizer or a Minimum Mean Squared Error. But those approaches do not completely cancel ISI. In the article "Coding an Equalization for PPM on wireless infrared Channel" by Lee,. D. C. M; Kahn, J. M; Communications, IEEE Transactions on, Volume 47 Issue 2, Feb. 1999, Pages 255-260, an approach with a trellis coded modulation is presented. In this case, the dependency between the modulation (number of PPM) and the coding removes the flexibility from the system.

In the article "Performances of an indoor optical wireless PPM-CDMA system with interferences cancellation schemes" Sung Soo Hwang, Chanbum Park, Jae Hong Lee, Personal, Indoor and Mobile Radio Communications, 1997, "Waves of the Year 2000" PIMRC 1997, The $8^{th}$ IEEE International Symposium on, Volume 3, Sep. 1-4 1997, Pages 974-978, a system for canceling interferences between several users ("Multiple Access Interferences" using a SIC ("Subtract Interference Cancellation") is presented for a modulation "on-off keying" for optical systems; so the context of this algorithm is very specific.

SUMMARY OF THE INVENTION

The invention addresses the above discussed problems. An object of the invention is to use soft input/output decoders. Another object of the invention is to use an "A posteriori" or experience-based probability detector to process ISI with a Pulse Position Modulation.

Another object of the invention is to decode PPM by considering a very small symbol period for an increased data rate.

Thus the invention provides, according to an embodiment, a method of decoding an incident UWB signal including successive incident pulses respectively received during successive Pulse Repetition Periods, each incident pulse including one transmitted symbol among M possible symbols, the transmitted symbol being corrupted by Inter Symbol Interferences (ISI). The method includes determining a correlation matrix, whose terms respectively represent the correlation between all the M possible symbols transmitted in a current Pulse Repetition Period, and at least in the previous and in the next Pulse Repetition Periods. The method further includes performing a correlation between an incident current pulse received during a current PRP and the M possible symbols transmitted in the current PRP and at least in the previous and in the next PRPs for obtaining a correlation vector, preprocessing the correlation vector including reducing the effect of the ISI from the correlation vector by using the correlation matrix, and decoding the preprocessed correlation vector for obtaining the bits of the transmitted symbol included in the incident received current pulse.

In other words, according to an embodiment, the method proposes to treat the ISI to reduce the effect, by using a correlation matrix and a correlation vector to have an ISI template for the decoding step. So, such an approach has the advantage to be flexible and not limited to a specific application. Moreover, it has been observed that such a process increases the bit rate for signals corrupted by ISI, especially for short PRPs.

According to an embodiment, the decoding step further provides a decoded extrinsic value at bit level representative of the ISI. Then, an "a priori" or prior known information at symbol level about the ISI is determined from the decoded extrinsic value, and the preprocessing step is performed with the information at symbol level.

According to another embodiment, the decoding step provides a decoded extrinsic value at bit level representative of the ISI. Then, an "a priori" or prior known information at bit level about the ISI is determined from the decoded extrinsic value, and the preprocessing step is performed with the information at bit level. In that way, the method can be based on an iterative process at bit or at symbol level or both.

Thus, the approach of the present invention applied to PPM with ISI, is based on processes that could combine equalization and channel coding such as Turbo equalization for example.

According to a variation of the invention, the preprocessing step comprises the step of computing a first channel likelihood from the correlation matrix and the correlation vector. In a preferred embodiment, the preprocessing step comprises a step of producing a first extrinsic value at symbol level from the channel likelihood and from the prior known information at symbol level. In another embodiment, the preprocessing step further comprises a step of converting the first extrinsic value at symbol level into a second extrinsic value at bit level by using the information at bit level.

According to another variation, the preprocessing step comprises a step of determining an ISI information from the prior known information at symbol level, a step of subtracting the ISI information from the correlation vector for obtaining an intermediate vector and a step of calculating a second channel likelihood from the intermediate vector. In other words, the second variation is based in the iterative subtraction of undesirable ISI estimated by probabilities obtained during the decoding step. This variant has the advantage of being very simple to implement. It could be used for example for the applications which must not be too demanding in term of latency.

According to an embodiment, the step of determining the ISI information comprises performing a symbol estimation from the prior known information at symbol level. According to another embodiment, the preprocessing step comprises a step of producing a third extrinsic value at symbol level from the second channel likelihood. According to another embodiment, the preprocessing step comprises a step of converting the third extrinsic value at symbol level into a fourth extrinsic value at bit level by using the prior known information at bit level.

Furthermore, the incident signal may be an M-pulse position modulated signal. The incident signal may also be an M-Bipolar pulse position modulated signal.

The invention also provides an apparatus for decoding an incident UWB signal including successive incident pulses respectively received during successive Pulse Repetition Periods, each incident pulse including one transmitted symbol among M possible symbols, the transmitted symbol being corrupted by Inter Symbol Interferences (ISI). The apparatus may include a memory for storing a correlation matrix, whose terms respectively represent the correlation between all the M possible symbols transmitted in a current Pulse Repetition Period, and at least in the previous and in the next Pulse Repetition Periods, and a correlation unit or means for performing correlation between an incident current pulse received during a current PRP and the M possible symbols transmitted in the current PRP and at least the previous and the next PRPs for obtaining a correlation vector. The apparatus may also include a preprocessing unit or means connected to the memory for preprocessing the correlation vector including reducing the effect of the ISI from the correlation vector, and a decoder or decoding means for decoding the preprocessed correlation vector for obtaining the bits of the transmitted symbol included in the current pulse.

According to a preferred embodiment of the invention, the decoder is adapted to provide a decoded extrinsic value at bit level representative of the ISI. The apparatus further comprises a first feed-back loop connected between the decoder and the preprocessing unit, the first feed-back loop comprising a first determination unit or means for determining an "a priori" or prior known information at symbol level about ISI from the decoded extrinsic value and delivering the information at symbol level to the preprocessing unit.

According to another embodiment of the invention, the decoder is adapted to provide a decoded extrinsic value at bit level representative of the ISI. The apparatus further comprises a second feed-back loop connected between the decoder and the preprocessing unit, the second feed-back loop comprising a second determining unit or means for determining a prior known information at bit level about ISI from the decoded extrinsic value and delivering the information at bit level to the preprocessing unit.

According to an embodiment of the invention, the decoder comprises a Soft In-Soft Out decoder including an input connected to the output of the preprocessing unit, a first output delivering the bits of the decoded symbol and a second output delivering the decoded extrinsic information. According to a first embodiment of the invention, the preprocessing unit comprises a computing unit or means for computing a first channel likelihood from the correlation matrix and the correlation vector.

According to an embodiment of the invention, the preprocessing unit may comprise an experienced-based probability detector for producing a first extrinsic value at symbol level from the first channel likelihood and from the prior known information at symbol level.

According to an embodiment of the invention, the preprocessing unit may comprise a second determining unit or means for converting the first extrinsic value at symbol level into a second extrinsic value at bit level from the information at bit level.

According to a second embodiment of the invention, the first feed-back loop comprises a third determination unit or means for determining an ISI information from the information at symbol level. The preprocessing unit may comprise a subtracting unit or means for subtracting the ISI information from the correlation vector for obtaining an intermediate vector and a unit or means for calculating a second channel likelihood from the intermediate vector.

According to an embodiment of the invention, the third determination unit may comprise a unit or means for performing a symbol estimation from the information at symbol level. According to an embodiment of the invention, the preprocessing unit may comprise an experienced-based probability detector for producing an extrinsic value at symbol level from the channel likelihood.

According to an embodiment of the invention, the preprocessing unit may comprise an experienced-based probability detector for producing a third extrinsic value at symbol level from the second channel likelihood. According to an embodiment of the invention, the incident signal is an M-pulse position modulated signal. According to an embodiment of the invention, the incident signal is an M-Bipolar pulse position modulated signal.

The invention is also directed to a receiving system, in particular, for wireless communication network, which incorporates the above defined apparatus. For example, the invention could used for Wireless Personal Area Network (WPAN).

BRIEF DESCRIPTION OF THE DRAWINGS

Other advantages and features of the invention are evident based upon the detailed description of embodiments, and of the appended drawings in which.

DETAILED DESCRIPTION OF THE PREFERRED EMBODIMENTS

Figure 1:
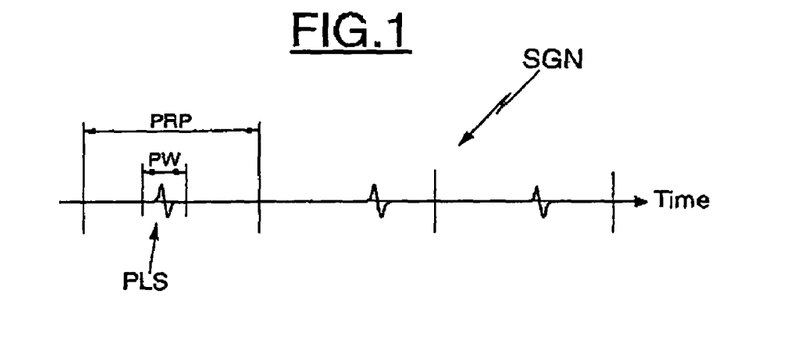
FIG. 1 is a timing diagram showing an example of a signal conveyed from several pulses.

FIG. 1 represents an Ultra Wideband signal SGN with a PPM modulation. The signal SGN comprises several pulses PLS with a predetermined shape, for instance a pseudo sine curve with a given amplitude. Each pulse PLS is emitted during a time window PW, for instance with a time length of 1 ns. Successive pulses PLS are contained in the Pulse Repetition Periods PRP also called Symbol Times. Its time length is determined from the transmission channel characteristics like the channel length for instance. Each PRP is defined to contain only one pulse PLS.

Figure 2:
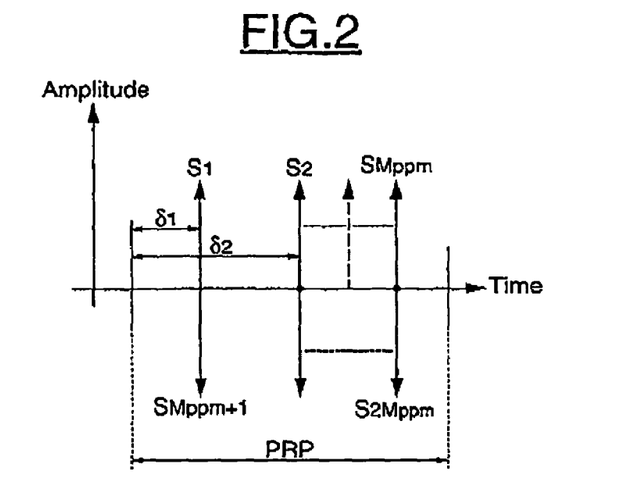
FIG. 2 is a timing diagram showing a set of PPM and Bipolar-PPM signals.

As represented on FIG. 2, the pulse position can be delayed inside a Pulse Repetition Period PRP with a delay $\delta_i$ for the $i^{st}$ pulse position, so as to encode different symbol $S_i$. For instance, to encode the symbol $S_1$, the pulse PLS is delayed with a delay $\delta_1$ from the beginning of the PRP. Thus for an $M_{PPM}$ PPM signal set, $M_{PPM}$ different symbols can be transmitted with respective delays $\delta_1 \ldots \delta_M^{PPM}$ inside the pulse PRP.

Furthermore, these delays can include time-hopping which is often used for multi user system. So it is not mandatory to have uniformly spaced pulse position. For an $M_{PPM}$ Bi-PPM signal set which further comprises the dashed lined signal set, $2*M_{PPM}$ different symbols can be transmitted with respective delays $\delta_1 \ldots \delta_M^{PPM} \ldots \delta_{2*M}^{PPM}$ inside the pulse PRP. Indeed, in this case, the PPM modulation is extended by adding the polarity parameter.

Figure 3:
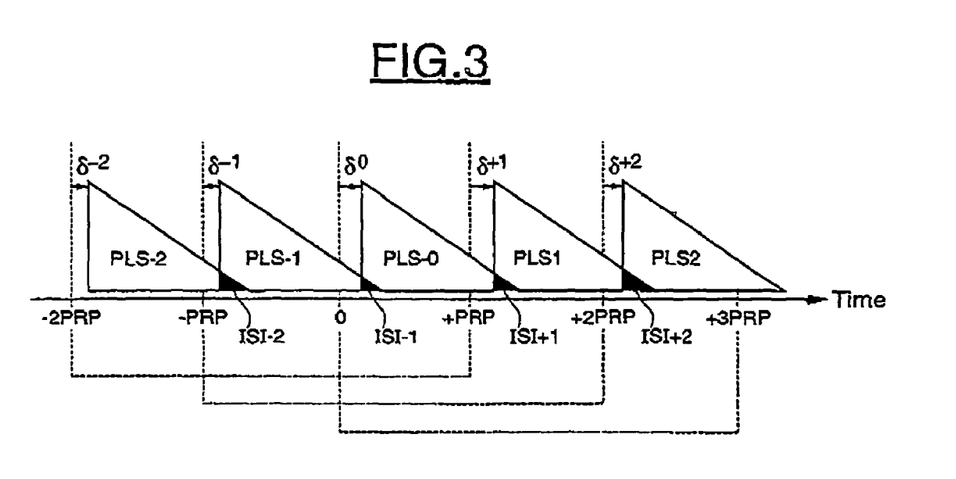
FIG. 3 is a timing diagram showing an example of a time representation of Inter Symbol Interferences.

FIG. 3 schematically represents pulses corrupted by Inter Symbol Interferences (ISI). Indeed, owing to the reflections occurring in the transmission channel, multiple transmission paths may appear. Consequently, each transmitted symbol is corrupted by the previous and the following transmitted symbols. For a current channel model (for example channel models used in IEEE 802.15[2]), the main path is typically concentrated in the first 20 ns. Thus, if the PRP is in the order of 5 to 7 ns, the ISI is spread over 3 symbols at least. More generally, if $n_{ISI}$ represents the number of PRP affected by the channel time length, the ISI corrupts $2n_{ISI}+1$ symbols.

FIG. 3 illustrates the case when $n_{ISI}$ is equal to 1, which will be the case considered in the whole description. PLS0 represents the current signal delayed with the delay $\delta_0$, which is sent in the current PRP. PLS-2, PLS-1, PLS+1, PLS+2 represent the pulses transmitted in following and the previous PRP respectively associated to the delays $\delta_{-2}$, $\delta_{-1}$, $\delta_{+1}$ and $\delta_{+2}$. As $n_{ISI}$ is equal to 1, 3 symbols are corrupted, respectively PLS−1 by ISI−2 and ISI−1, PLS0 by ISI−1 and ISI+1 and PLS+1 by ISI+1 and ISI+2.

Figure 4:
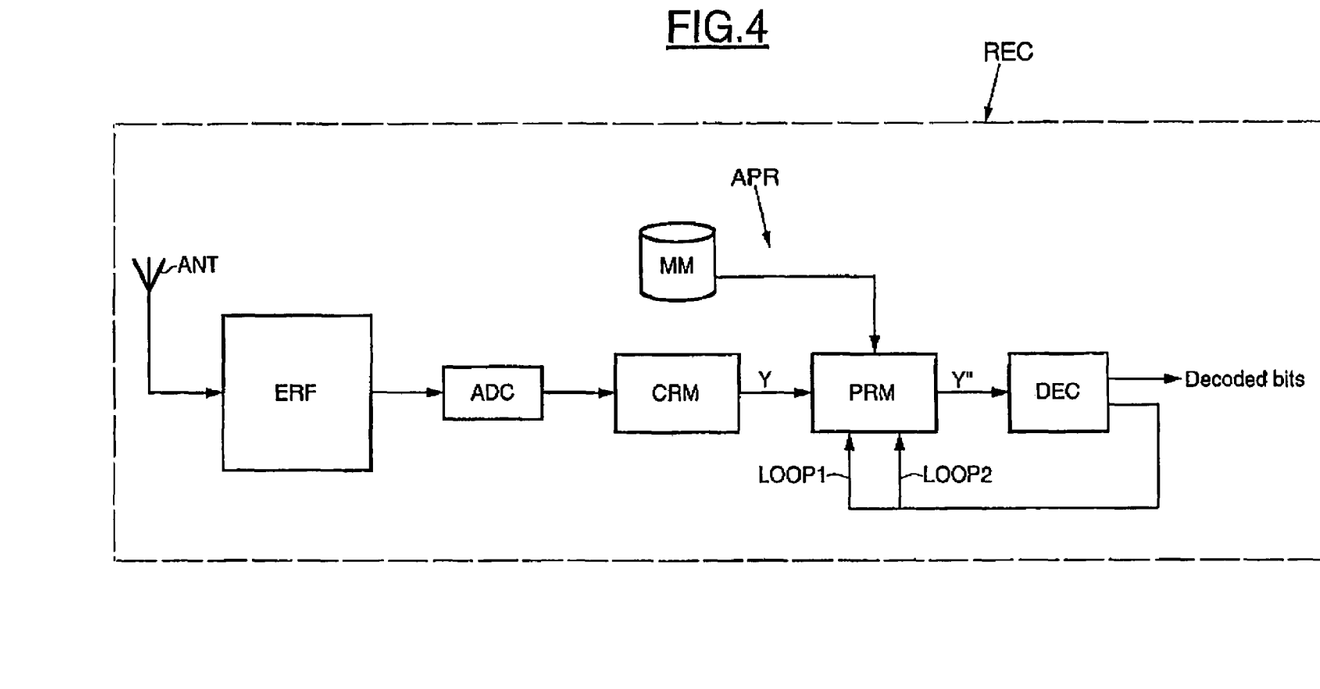
FIG. 4 is a schematic diagram showing an example of a receiver chain including an apparatus according to the invention.

As illustrated in FIG. 4, which shows an example of a receiver chain REC including an apparatus APR according to the invention. The receiver chain REC could be an Ultra Wide Band receiver chain incorporated in a wireless communication network for instance, although the invention is not limited to this particular application. A given signal is received by an antenna ANT of the receiver chain REC. Then, the signal is subjected to frequency process in the block ERF, before being converting in a digital signal r(t) in an analog to digital converter ADC, where r(t) is:

$$r(t) = \sum_{k=-\infty \ldots +\infty} s(t - kPRP - \delta^k) + n(t),$$

where s(t) is the composite response if the pulse and ISI channel, n(t) is an Additive White Gaussian Noise (AWGN) which corrupts the transmission, k is the number of the PRP, $\delta^k$ is the pulse delay in the $k^{st}$ PRP.

To analyze the ISI effect, the signal r(t) is delivered to correlation means CRM, which comprise $M^{PPM}$ correlators for each considered PRPs, which are the current PRP, the previous one and the following one in case $n_{ISI}$ is equal to 1. For each considered PRP, the correlators output are $Y^{-1}$, $Y^{-0}$ and $Y^{+1}$, which are $M_{PPM}$ column vectors. Perfect correlators like matched filters correspond to the ideal case, but mismatches and defaults can also be introduced. Thus, if $s_i(t)$ is the template of the $i^{th}$ correlators, the correlators' outputs are for i from 1 to $M_{PPM}$:

$$Y_i^{-1} = <r(t), s_i^{-1}(t)>$$

which is the $i^{th}$ correlator output in the previous PRP, $$Y_j^{+1} = <r(t), s_i^0(t)>$$

which is the $i^{th}$ current correlator output, and $$Y_i^{+1} = <r(t), s_i^{+1}(t)>$$

which is the $i^{th}$ correlator output in the following PRP.

These outputs are gathered in a 3 $M_{PPM}$ column vector, the correlation vector Y:

$$Y = (Y[i])_{i=1 \ldots 3M_{ppm}} = \begin{pmatrix} Y^{-1} \\ Y^0 \\ Y^{+1} \end{pmatrix}.$$

In the general case, the correlation vector Y is a $(2n_{ISI}+1) M_{PPM}$ vector.

To characterize this vector and analyze the ISI effect, a correlation matrix $\Gamma$ is defined and stored in a memory MM. For i from 1 to $M_{PPM}$:

$$(\Gamma_{-1})_{i,j} = <s_i^{-1}(t), s_j^0(t)> (\Gamma_0)_{i,j} = <s_i^0(t), s_j^0(t)> (\Gamma_{+1})_{i,j} = <s_i^{+1}(t), s_j^0(t)> = (\Gamma_{-1}^t)_{i,j}$$

These terms express respectively the ISI between a current PRP and the previous one, the current PRP and itself and the current PRP and the following one. With these three terms $\Gamma_{-1}$, $\Gamma_0$ and $\Gamma_{+1}$ ISI between the symbols contained in PRPs and having such a shift can be analyzed, that is to say in this given example PLS0, PLS−2, PLS−1, PLS+1 and PLS+2.

Consequently, the $(2n_{ISI}+1)M_{PPM} * (2n_{ISI}+1)M_{PPM}$ square matrix $\Gamma$ is defined by:

$$\Gamma = \begin{pmatrix} \Gamma_0 & \Gamma_{-1} & 0 \\ \Gamma_{-1}^t & \Gamma_0 & \Gamma_{-1} \\ 0 & \Gamma_{-1}^t & \Gamma_0 \end{pmatrix}.$$

With this correlation matrix, the ISI for $2*n_{ISI}+1$ can be analyzed, that is to say PLS0, PLS+1 and PLS−1, which are corrupted by PLS0, PLS−2, PLS−1, PLS+1 and PLS+2. Moreover, the mean my of the correlation vector Y can be expressed using terms of $\Gamma_{-1}$ and $\Gamma_0$:

$$m_Y = (m_Y[i])_{i=1 \ldots 3M_{ppm}} = \begin{pmatrix} m_{Y-1} \\ m_{Y0} \\ m_{Y+1} \end{pmatrix} = \begin{pmatrix} \langle s^{-2}(t), s_1^{-1}(t) \rangle + \langle s^{-1}(t), s_1^{-1}(t) \rangle + \langle s^0(t), s_1^{-1}(t) \rangle \\ \vdots \\ \langle s^{-2}(t), s_{M_{ppm}}^{-1}(t) \rangle + \langle s^{-1}(t), s_{M_{ppm}}^{-1}(t) \rangle + \langle s^0(t), s_{M_{ppm}}^{-1}(t) \rangle \\ \langle s^{-1}(t), s_1^0(t) \rangle + \langle s^0(t), s_1^0(t) \rangle + \langle s^{+1}(t), s_1^0(t) \rangle \\ \vdots \\ \langle s^{-1}(t), s_{M_{ppm}}^0(t) \rangle + \langle s^0(t), s_{M_{ppm}}^0(t) \rangle + \langle s^{+1}(t), s_{M_{ppm}}^0(t) \rangle \\ \langle s^0(t), s_1^{+1}(t) \rangle + \langle s^{+1}(t), s_1^{+1}(t) \rangle + \langle s^{+2}(t), s_1^{+1}(t) \rangle \\ \vdots \\ \langle s^0(t), s_{M_{ppm}}^{+1}(t) \rangle + \langle s^{+1}(t), s_{M_{ppm}}^{+1}(t) \rangle + \langle s^{+2}(t), s_{M_{ppm}}^{+1}(t) \rangle \end{pmatrix}$$

Finally, the covariance matrix $(Cov)_{k,1}$ is defined from the mean my:

$$(Cov)_{k,1} = E\{(Y-m_Y)(Y-m_Y)^t\}$$

with $$Cov[k][l] = \frac{N_0}{2} * \Gamma(k, l)$$

where $N_0/2$ is the variance of a one-dimensional noise projection.

After the correlation process, the correlation vector Y is delivered to preprocessing means PRM of an apparatus APR according to the invention. The preprocessing means PRM elaborate a preprocessed vector Y" by using the correlation matrix $\Gamma$ stored in the memory MM. The preprocessed vector Y" is then delivered to decoding means DEC which decode the bits of the received signal r(t). Besides, the decoding means DEC deliver to preprocessing means PRM, several a priori information at two different levels by two feed-back loops LOOP1 and LOOP2, in order to improve the preprocessing step.

Figure 5:
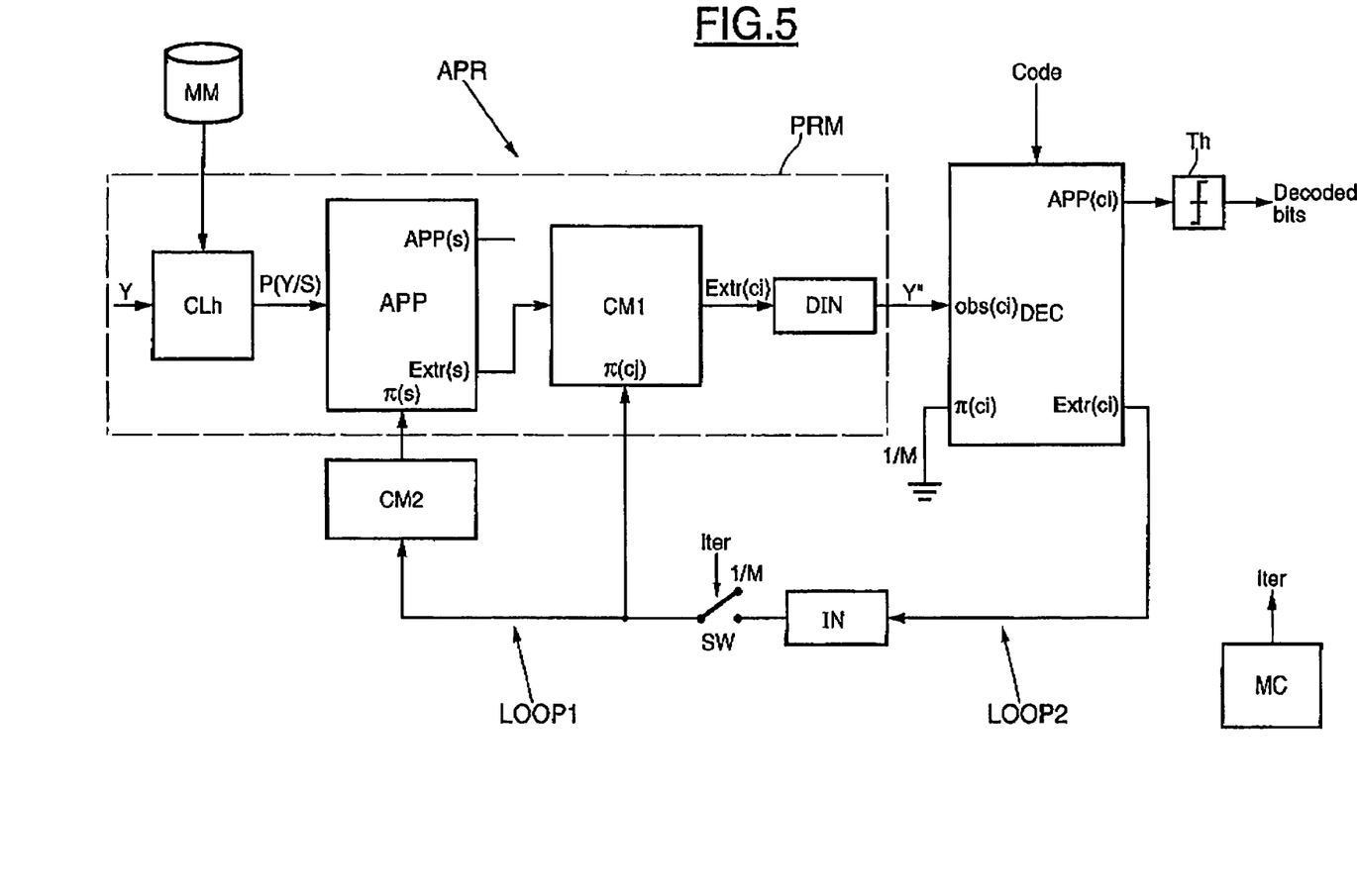
FIG. 5 is a schematic diagram showing an example of a general view of a first embodiment of the invention.
Figure 6:
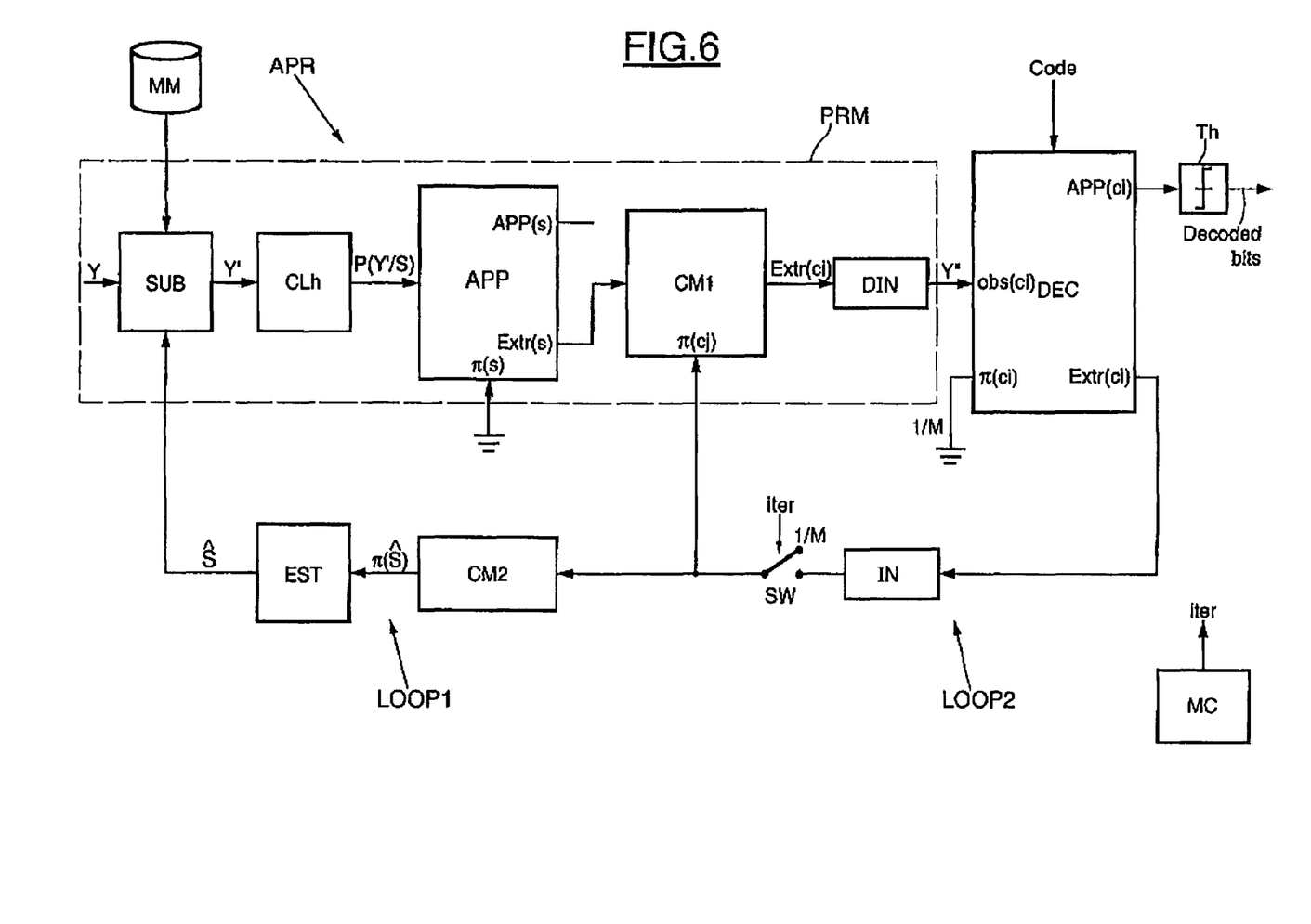
FIG. 6 is a schematic diagram showing an example of a general view of a second embodiment of the invention with the cancellation of the ISI.

FIG. 5 shows a more detailed apparatus APR according to the invention. The correlation vector Y as defined above, is delivered to a Channel Likelihood computer CLh, which calculates a Channel Likelihood P(Y/S), said first Channel Likelihood, from the correlation vector Y. This value P(Y/S) is the probability for having received the correlation vector Y knowing the received symbol among the considered sequence of symbols S, which corresponds to $s^{-2}, \ldots, s^{+2}$ in this example.

Depending on channel model, parameters value and level approximation, different expressions of the conditional probability P(Y/S) can be calculated. To calculate the conditional probability $P(Y/s^{-2}, \ldots, s^{+2})$ in an optimal way and for the given sequence of symbols $s^{-2}, \ldots, s^{+2}$, the mean $m_Y$ and the covariance matrix $\Gamma$ are used. The optimal Likelihood is defined by:

$$P(Y | s^{-2}, \ldots, s^{+2}) = Lh_{opt}(S) \propto e^{-\frac{(Y-m_Y)^t \Gamma^{-1}(Y-m_Y)}{N_0}},$$

$Lh_{opt}$ being the optimal gain of the transmission channel.

However, the complexity of this expression is in the order of $9M_{ppm}^2$ and more generally $(2n_{ISI}+1)2*M_{PPM}^2$. Then, for each received signal, $M_{PPM}^5$ Likelihoods need to be stored. To reduce the overall complexity, the number of sequences may be decreased. For instance, only the correlators' output in the current PRP, $Y^0$ can be considered. Thus only the ISI due to the previous and the following symbols are taken into account.

The suboptimal Likelihood is:

$$P(Y | s^{-1}, \ldots, s^{+1}) = Lh_{Subopt}(S) \propto e^{-\frac{(Y^0-m_Y^0)^t(\Gamma^0)^{-1}(Y^0-m_Y^0)}{N_0}},$$

$Lh_{subopt}$ being the suboptimal gain of the transmission channel, and $m^0_Y$ being a suboptimal expression of the mean corresponding the correlators' outputs. Each coordinate of this $M_{PPM}$ column vector $m^0_Y$, is equal to:

$$m_Y^0[i] = \langle s^{-1}(t), s_j^0(t) \rangle + \langle s^0(t), s_j^0(t) \rangle + \langle s^{+1}(t), s_j^0(t) \rangle,$$

for i from 1 to $M_{PPM}$.

The Channel Likelihood P(Y/S) is delivered to an "A Posteriori" or experienced-based Probability detector APP, which treats the ISI by calculating an A Posteriori Probability APP(s) and an extrinsic value Extr(s) at symbol level, the second extrinsic value, these two expressions being linked by an equation detailed below. Both values are calculated from the Channel Likelihood P(Y/S) and a probability value called a priori probability $\pi(s)$ whose determination will be explained below.

By definition, the A Posteriori Probability APP(s) corresponding to the symbol sent in the $k^{th}$ PRP, $s^k(t)$, is a conditional probability according to the received signal r(t). Considering that the symbol in the current PRP is processing, without knowing the value of the given symbol, the A Posteriori Probability APP(s) is:

$$APP(s^0) = P(s^0|r) = P(s^0|Y^{-1}, Y^0, Y^{+1}) = P(s^0|Y,$$

with the sufficient statistic that $s^0$ is only dependent on the PRPs labelled −1, 0 and +1.

The expression can be developed by $$APP(s^0) \propto Extr(s^0) \cdot \pi(s^0) \text{ where } \pi(s_0) = P(s_0).$$

The output delivering the probability APP(s) can be used to make hard decision on symbol but in this process, only the extrinsic output is used. Generally, the extrinsic value $Extr(s_k)$ is the probability to obtain the received signal knowing the symbol $s^k$, $Extr(s_0) = P(Y|s^0)$. More precisely, the extrinsic information is obtained by a sum-product formula using the channel likelihoods P(Y/S) and the a priori probability $\pi(s)$ of the symbols in the surrounding PRPs:

$$Extr(s^0) = \sum_{S/s^0} P(Y, s^{-2}, s^{-1}, s^{+1}, s^{+2} \mid s^0)$$

$$= \sum_{S/s^0} P(Y \mid S) \prod_{i=-2,-1,+1,+2} \pi(s^i).$$

The APP detector can treat the ISI according to two different ways: an optimal way and a suboptimal way.

In this embodiment, an optimal way to directly treat the ISI is:

$$Extr_{opt}(s^0) = \sum_{s^{-2}, s^{-1}, s^{+1}, s^{+2}} Lh_{opt}(S = s^{-2}, s^{-1}, s^0, s^{+1}, s^{+2})$$

$$\prod(s^{-2}(t)) \cdot \prod(s^{-1}(t)) \cdot \prod(s^{+1}(t)) \cdot \prod(s^{+2}(t))$$

where $\Pi(s^k(t))$ is the $M_{PPM}$ a priori vector for the symbol $s^k$.

The number of product and sum operations is then $M_{PPM}^4$. Indeed, the calculation requires an exhaustive scan of all possible sequences of symbols. Consequently, the more $M_{PPM}$ and $n_{ISI}$ increase, the more the method is complex.

A suboptimal extrinsic value can also be calculated by using the suboptimal version of the channel likelihood. This extrinsic value is then obtained by summing only on $s^{-1}$ and $s^{+1}$:

$$Extr_{Subopt}(s^0) \propto \sum_{s^{-1}, s^{+1}} Lh_{Subopt}(S = s^{-1}, s^0, s^{+1}) \prod(s^{-1}(t)) \cdot \prod(s^{+1}(t)).$$

In this case, only $M^2$ product and sum operations are needed.

The extrinsic value at symbol level Extr(s) is then delivered to converting means CM1, for instance a marginalization block. This block aims at operating a signal to binary conversion on the extrinsic value Extr(s), the first extrinsic value, so as to get $Extr(c_i) \propto p(Y/c_i)$. Indeed, the error correcting codes generally used are binary. In consequence, a conversion is needed before the decoding step. For a symbol corresponding to m bits via a mapping bijection, the conversion can be operated by using an a priori information $\pi(c_j)$, for example:

$$Extr(c_i) = \sum_{s/c_i} Extr(s) \prod_{j=1, j \neq i}^{m} \pi(c_j),$$

where $c^i$ is the considered bit.

The extrinsic value $Extr(c_i)$ may be delivered to a de-interleaver DIN. This block is complementary to an interleaver block comprised in the emitter chain. It aims at arranging the bits of a treated symbol, that were mixed by the interleaver block of the emitter chain, to improve the transmission performances. The arranged bits are delivered to the decoder DEC as a preprocessed vector Y". The decoder DEC could be for instance a Soft In Soft Out decoder. The decoder DEC receives a code structure to decode the received bit. It may be for example a Turbo code but also a convolutional code or LDPC codes.

The received value is called an observation $obs(c_i)$, which corresponds to the probability to get the binary value "1", knowing that the possible values are "0" or "1". In an other embodiment, the observation could also be the probability to get the binary value "0".

From this observation $obs(c_i)$, the decoder DEC outputs two probabilities: an a posteriori value $APP(c_i)$ and the extrinsic value at bit level $Extr(c_i)$, said decoded extrinsic value. The a posteriori value $APP(c_i)$ is calculated from an a priori value $\pi(c_i)$ delivered to the decoder DEC too. In this embodiment, the a priori value $\pi(c_i)$ is fixed at 1/M, where M is the number of signals, that is to say $M_{PPM}$ or $2*M_{PPM}$ in case of Bipolar-PPM modulation. $\pi(c_i)$ is chosen equal to 1/M to make each symbol equiprobable. In an other embodiment, the a priori value could be variable.

The a posteriori value $APP(c_i)$ is equal to:

$$APP(c_j) \propto obs(c_j) * \pi(c_j).$$

This a posteriori value $APP(c_i)$ is compared to a threshold Th so as to obtain the decoded bit.

However, instead of decoding the bit from the first treating step, the process may be iterative so as to improve the global performances. In this case, the decoder DEC delivered the extrinsic value $Extr(c_i)$ by the first feed-back loop LOOP1. The extrinsic values for every bits are mixed up by an interleaver IN to add randomness at the input of the decoder, and then delivered to binary to symbol converting means CM2 and to the a posteriori detector APP as the a priori value $\pi(s)$ mentioned above.

This first feed-back loop LOOP1 aims at performing iterations at symbol level to reduce the effect to the ISI. Indeed, the a posteriori detector APP uses the extrinsic value $Extr(c_i)$ as an a priori information about the environment. The converting means CM2 are used to convert the extrinsic values from the SISO decoder DEC into a priori information per symbol. The bit to symbol conversion can be expressed as follows:

$$\pi(s) \propto \prod_{j=1}^{m} Extr(c_j).$$

In case the apparatus APR processes the first iteration, meaning that no a priori value has been calculated, a controlled switch SW connects the converting means CM2 to the value 1/M. The switch SW is controlled by a signal iter delivered by commanding means MC. Moreover, the extrinsic value $Extr(c_i)$ can be delivered by the SISO decoder DEC by the second feed-back loop LOOP2. This value is delivered to the marginalization block CM1 as the a priori value $\pi(c_j)$ mentioned above. This second feed-back loop LOOP2 aims at performing iterations at bit level. It is particularly efficient when many bits are used to encode each symbol.

After a given number of iterations, when the result does not improve in a significant way anymore, the decoded step is performed from $APP(c_i)$. The number of iterations may be determined during prior tests. To improve the speed of processing, the ISI preprocessing step can be performed in an optimal way for the first iterations, and in a suboptimal way for the following iterations. As a consequence, the decoding remains highly effective, whereas its complexity decreases.

FIG. 5 illustrates a Subtract Interference Cancellation (SIC) version of the invention. The apparatus APR receives in input the correlation vector Y. In a simplest version, it can receive only the correlators' output $Y_0$. In the following description, this simplest version will be considered. The correlation vector is delivered to an interference subtraction block SUB. This bloc aims at cancelling the interferences from the correlation vector before the channel likelihood computing. Consequently, after the ISI subtraction, the methods for signals without ISI can be used.

In this embodiment, to subtract the ISI, the block SUB receives an estimation $\hat{S}$ of the sequence of symbol. This estimated sequence is determined by a symbol estimation block EST, said third determination means, from an priori value per symbol $\pi(\hat{S})$. This value $\pi(\hat{S})$ is elaborated by the converting means CM2, situated in the first feed-back loop LOOP1, from an extrinsic value $Extr(c_i)$, said decoded extrinsic value, delivered by the SISO decoder DEC. For example, considering the symbol sent one PRP before the current time, the estimated symbol is:

$$\hat{s}^{-1}(t) = \sum_{J=1}^{M} \Pi(s_j^{-1}(t)) \cdot s_j^{-1}(t) = E_{EXTR}[s_j^{-1}(t)] \approx s^{-1}(t).$$

So, the interference subtraction block SUB subtracts the symbol estimation weighted by the correlation matrix $\Gamma$ as follows:

$$Y' = Y^0 - \Gamma_{-1}\Pi_{-1} - \Gamma_{+1}\Pi_{+1}$$

where $\Pi_{-1}, \Pi_{+1}$, are the a priori vectors for the estimated symbols.

The channel likelihood computer CLh and the detector APP of the embodiment represented on the FIG. 4 are replaced by a simplest version used for signal without interference. Then the extrinsic value, said third extrinsic value, delivered by the detector APP is proportional to a second likelihood P(Y'/S) calculated for a signal without interference:

$$Extr_{simple} = (s^0 = s_k(t)) \propto e^{-\frac{(Y^0 - \Gamma_k^0)^t (\Gamma_0)^{-1}(Y^0 - \Gamma_k^0)}{N_0}}.$$

The number of operations that are made, is in the order of $M_{PPM}^2$.

The following converting and decoding steps could be the same that the converting and decoding steps realized for signals without interference. The number of operation is then in the order of $2n_{ISI}M_{PPM}^2$, which makes the SIC solution be a very simple solution.

That which is claimed is:

1. A method of decoding an incident UWB signal including successive incident pulses respectively received during successive Pulse Repetition Periods (PRPs), each incident pulse including a transmitted symbol among a number M of possible symbols, said method comprising:
   determining a correlation matrix including terms respectively representing the correlation between the M possible symbols transmitted in a current PRP, and at least in a previous PRP and in a next PRP;
   performing a correlation between received incident pulse received during a current PRP and the M possible symbols transmitted in said current PRP and at least in the previous and in the next PRPs for obtaining a correlation vector;
   preprocessing said correlation vector including reducing an effect of Inter Symbol Interferences (ISI) from said correlation vector by using said correlation matrix; and
   decoding said preprocessed correlation vector for obtaining bits of the transmitted symbol included in said received incident pulse.

2. The method according to claim 1, wherein said decoding further provides a decoded extrinsic value at bit level representative of said ISI, wherein an a priori information at symbol level about said ISI is determined from said decoded extrinsic value and wherein the preprocessing is performed with said a priori information at symbol level.

3. The method according to claim 1, wherein said decoding provides a decoded extrinsic value at bit level representative of said ISI, wherein an a priori information at bit level about said ISI is determined from said decoded extrinsic value, and wherein the preprocessing is performed with said a priori information at bit level.

4. The method according to claim 3, wherein said preprocessing comprises computing a first channel likelihood from the correlation matrix and the correlation vector.

5. The method according to claim 4, wherein the preprocessing comprises producing a first extrinsic value at symbol level from the channel likelihood and from said a priori information at symbol level.

6. The method according to claim 5, wherein the preprocessing further comprises converting said first extrinsic value at symbol level into a second extrinsic value at bit level by using said a priori information at bit level.

7. The method according to claim 3, wherein the preprocessing comprises determining an ISI information from said a priori information at symbol level, subtracting the ISI information from said correlation vector for obtaining an intermediate vector, and calculating a second channel likelihood from said intermediate vector.

8. The method according to claim 7, wherein determining said ISI information comprises performing a symbol estimation from said a priori information at symbol level.

9. The method according to claim 8, wherein the preprocessing comprises producing a third extrinsic value at symbol level from said second channel likelihood.

10. The method according to claim 9, wherein the preprocessing comprises converting said third extrinsic value at symbol level into a fourth extrinsic value at bit level by using said a priori information at bit level.

11. The method according to claim 1, wherein the received incident signal is an M-pulse position modulated signal.

12. The method according to claim 1, wherein the received incident signal is an M Bipolar-pulse position modulated signal.

13. An apparatus for decoding an incident UWB signal including successive incident pulses respectively received during successive Pulse Repetition Periods (PRPs), each incident pulse including a transmitted symbol among M possible symbols, the apparatus comprising:
   a memory for storing a correlation matrix including terms respectively representing the correlation between the M possible symbols transmitted in a current PRP, and at least in a previous PRP and in a next PRP;
   correlation means for performing correlation between a received incident pulse received during a current PRP and the M possible symbols transmitted in said current PRP and at least the previous and the next PRPs for obtaining a correlation vector;

preprocessing means connected to said memory for preprocessing said correlation vector including reducing an effect of Inter Symbol Interferences (ISI) from said correlation vector; and decoding means for decoding said preprocessed correlation vector for obtaining bits of the transmitted symbol included in the received incident pulse.

14. The apparatus according to claim 13, wherein the decoding means are adapted to provide a decoded extrinsic value at bit level representative of said ISI, wherein said apparatus further comprises a first feed-back connected between the decoding means and the preprocessing means, said first feed-back loop comprising first determination means for determining an a priori information at symbol level about the ISI from sad decoded extrinsic value and delivering said a priori information at symbol level to the preprocessing means.

15. The apparatus according to claim 13, wherein the decoding means are adapted to provide a decoded extrinsic value at bit level representative of said ISI, wherein said apparatus further comprises a second feedback loop including second determining means for determining an a priori information at bit level about ISI from said decoded extrinsic value and delivering said a priori information at bit level to the preprocessing means.

16. The apparatus according to claim 14, wherein the decoding means comprises a Soft In-Soft Out decoder including an input connected to the output of the preprocessing means, a first output delivering the bits of the decoded symbol and a second output delivering said decoded extrinsic information.

17. The apparatus according to claim 16, wherein the preprocessing means comprises computing means for computing a first channel likelihood from the correlation matrix and the correlation vector.

18. The apparatus according to claim 17, wherein the preprocessing means comprises an a posteriori probability detector for producing a first extrinsic value at symbol level from the first channel likelihood and from said a priori information at symbol level.

19. The apparatus according to claim 18, wherein the preprocessing means comprises second determining means for converting said first extrinsic value at symbol level into a second extrinsic value at bit level from said a priori information at bit level.

20. The apparatus according to claim 13, wherein the first feed-back loop comprises third determination means for determining an ISI information from said a priori information at symbol level, wherein said preprocessing means comprises subtracting means for subtracting the ISI information from said correlation vector for obtaining an intermediate vector and computing means for calculating a second channel likelihood from the intermediate vector.

21. The apparatus according to claim 20, wherein the said third determination means comprises means for performing a symbol estimation from said a priori information at symbol level.

22. The apparatus according to claim 21, wherein the preprocessing means comprises an a posteriori probability detector for producing a third extrinsic value at symbol level from the second channel likelihood.

23. The apparatus according to claim 22, wherein the preprocessing means comprises means for converting said third extrinsic value at symbol level into a fourth extrinsic value at bit level from said a priori information at bit level.

24. The apparatus according to claim 23, wherein the received incident pulse is an M-pulse position modulated signal.

25. The apparatus according to claim 24, wherein the received incident signal is an M Bipolar-pulse position modulated signal.

26. An apparatus for decoding a wireless communication signal including successive incident pulses respectively received during successive Pulse Repetition Periods (PRPs), each incident pulse including a transmitted symbol among M possible symbols, the apparatus comprising:

a memory to store a correlation matrix including terms respectively representing the correlation between the M possible symbols transmitted in a current PRP, and at least in a previous PRP and in a next PRP;

a correlation block to perform a correlation between a received incident pulse received during a current PRP and the M possible symbols transmitted in the current PRP and at least the previous and the next PRPs to obtain a correlation element;

a preprocessor associated with the memory to preprocess the correlation element including reducing an effect of Inter Symbol Interferences (ISI) from the correlation element; and a decoder to decode the preprocessed correlation element to obtain bits of the transmitted symbol included in the received incident pulse.

27. The apparatus according to claim 26, wherein the decoder provides a decoded extrinsic value at bit level representative of the ISI, wherein the apparatus further comprises a first feed-back loop connected between the decoder and the preprocessor, said first feed-back loop comprising a first determination unit to determine a recognized information at symbol level about the ISI from the decoded extrinsic value and delivering the recognized information at symbol level to the preprocessor.

28. The apparatus according to claim 26, wherein the decoder provides a decoded extrinsic value at bit level representative of the ISI, wherein said apparatus further comprises a second feed-back loop including a second determination unit to determine a recognized information at bit level about ISI from the decoded extrinsic value and delivering the recognized information at bit level to the preprocessor.

* * * * *

UNITED STATES PATENT AND TRADEMARK OFFICE
CERTIFICATE OF CORRECTION

PATENT NO. : 7,386,071 B2
APPLICATION NO. : 11/337029
DATED : June 10, 2008
INVENTOR(S) : Rouault et al.

It is certified that error appears in the above-identified patent and that said Letters Patent is hereby corrected as shown below:

| | |
|---|---|
| Column 1, Line 22 | Delete: "that"<br>Insert: --than-- |
| Column 2, Line 62 | Delete: "in"<br>Insert: --on-- |
| Column 2, Line 67 | Delete: "term"<br>Insert: --terms-- |
| Column 5, Line 16 | Delete: "$\delta_1...\delta_M^{PPM}$"<br>Insert: --$\delta_1...\delta_{M\,PPM}$-- |
| Column 5, Line 19 | Delete: "system"<br>Insert: --systems-- |
| Column 5, Line 23 | Delete: "$\delta_1...\delta_M^{PPM}...\delta_{2*M}^{PPM}$"<br>Insert: --$\delta_1...\delta_{M\,PPM}...\delta_{2*MPPM}$-- |
| Column 5, Line 42 | Delete: "in"<br>Insert: --in the-- |
| Column 5, Line 56 | Delete: "converting"<br>Insert: --converted-- |
| Column 5, Line 66 | Delete: "if"<br>Insert: --of-- |
| Column 6, Line 1 | Delete: "$M^{PPM}$"<br>Insert: --$M_{PPM}$-- |
| Column 6, Line 16 | Delete: "$Y_j^{+1}=<r(t),s_i^0(t)>$"<br>Insert: --$Y_j^0=<r(t),s_i^0(t)>$,-- |
| Column 7, Line 2 | Delete: "my"<br>Insert: --$m_y$-- |
| Column 8, Lines 31-32 | Delete: "corresponding the"<br>Insert: --corresponding to the-- |

UNITED STATES PATENT AND TRADEMARK OFFICE
CERTIFICATE OF CORRECTION

PATENT NO. : 7,386,071 B2
APPLICATION NO. : 11/337029
DATED : June 10, 2008
INVENTOR(S) : Rouault et al.

It is certified that error appears in the above-identified patent and that said Letters Patent is hereby corrected as shown below:

Column 8, Line 53  Delete:
"$APP(s^0)=P(s^0 \mid r)=P(s^0 \mid Y^1,Y^0,Y^{+1})=P(s^0 \mid Y$"
Insert:
--$APP(s^0)=P(s^0 \mid r)=P(s^0 \mid Y^1,Y^0,Y^{+1})=P(s^0 \mid Y)$--

Column 8, Line 63  Delete: "$(s_k)$"
Insert: --$(s^k)$--

Column 8, Line 64  Delete: "$(s_o)$"
Insert: --$(s^o)$--

Column 10, Line 16  Delete: "an other"
Insert: --another--

Column 10, Line 27  Delete: "every"
Insert: --the--

Column 11, Line 2  Delete: "$Y_o$"
Insert: --$Y^o$--

Column 11, Line 12  Delete: "an"
Insert: --a--

Signed and Sealed this

Seventh Day of October, 2008

JON W. DUDAS
*Director of the United States Patent and Trademark Office*